April 19, 1960     H. E. PITTS     2,933,158
AUXILIARY BRAKE FOR VEHICLE
Filed July 23, 1956     2 Sheets-Sheet 1
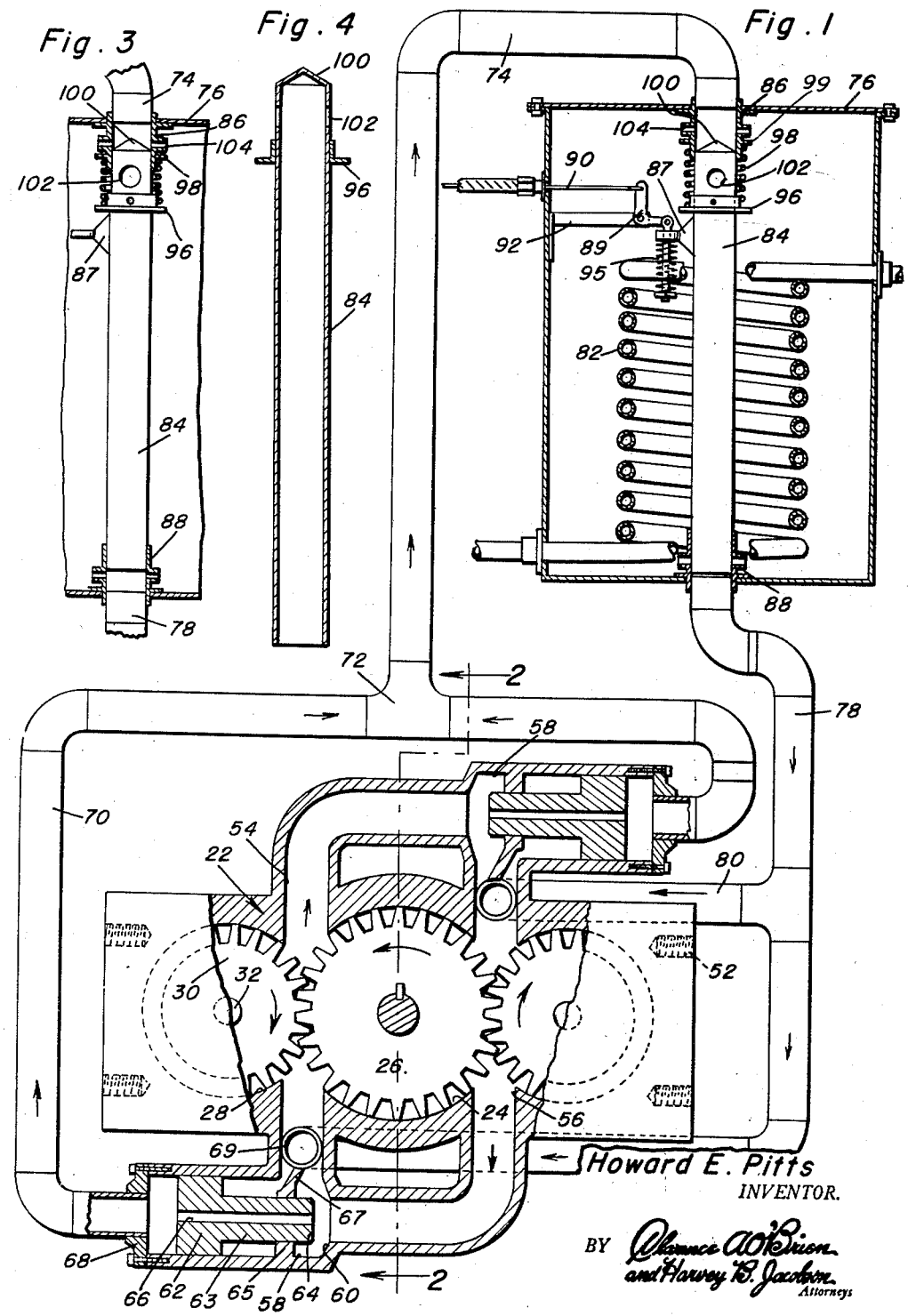

April 19, 1960     H. E. PITTS     2,933,158
AUXILIARY BRAKE FOR VEHICLE
Filed July 23, 1956     2 Sheets-Sheet 2
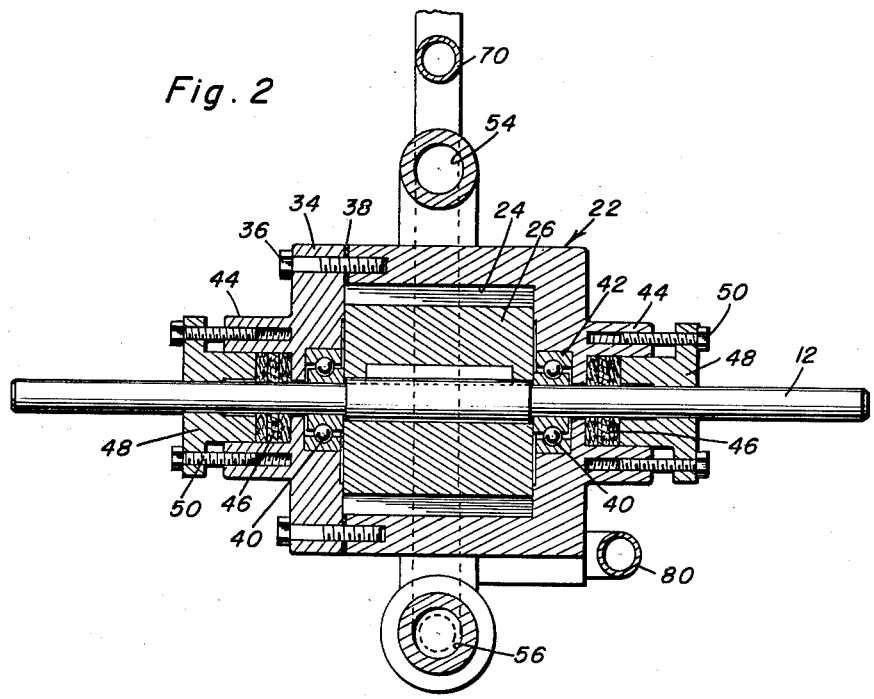
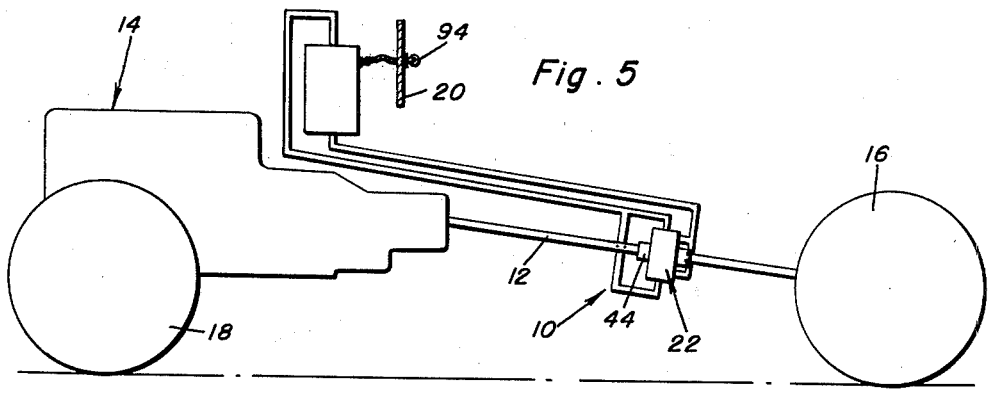
Howard E. Pitts
INVENTOR.

United States Patent Office 2,933,158
Patented Apr. 19, 1960

2,933,158
AUXILIARY BRAKE FOR VEHICLE
Howard E. Pitts, East Liverpool, Ohio
Application July 23, 1956, Serial No. 599,608
10 Claims. (Cl. 188—92)

This invention relates generally to a brake for a vehicle and more particularly relates to an auxiliary brake for association with the drive shaft of a vehicle such as a truck or the like and incorporates a positive displacement gear pump connected to the drive shaft together with means for throttling the discharge of such a pump for retarding the rotational speed of the drive shaft thereby slowing the vehicle.

An object of the present invention is to provide an auxiliary brake for association with a drive shaft of a truck or similar vehicle which incorporates a positive displacement hydraulic pump with throttling means for the dicharge thereof together with means for removing the fluid during periods of inoperativeness of the brake thereby reducing any drag of the brake to a substantial minimum.

Another object of the present invention is to provide a brake in accordance with the preceding object in which a pressure relief is provided to prevent excessive braking force being applied which could possibly result in breakage of the drive shaft or portions of the hydraulic pump.

Other objects of the present invention will reside in its simplicity of construction, ease of operation, ease of installation and its adaptation for its particular purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a schematic illustration of the auxiliary brake of the present invention with portions thereof being shown in section for illustrating the details of construction;

Figure 2 is a vertical sectional view taken substantially upon the plane passing along section line 2—2 of Figure 1 illustrating certain details of construction of the pump;

Figure 3 is an enlarged view of the control valve in the braking device;

Figure 4 is a vertical sectional view of the movable element forming the control valve; and Figure 5 is a schematic view of the brake of the present invention installed in a vehicle.

Referring now specifically to the drawings, the numeral 10 generally designates the auxiliary brake of the present invention which is mounted on a drive shaft 12 of a vehicle generally designated by the numeral 14 wherein the drive shaft 12 drives the rear wheels 16 in the usual manner and the vehicle is provided with front steerable wheels 18 and also is provided wtih a dashboard 20 in the operator's compartment or cab thereof.

The auxiliary brake includes a generally hollow casing generally designated by the numeral 22 which includes a central cylindrical recess 24 having a central gear 26 disposed therein with the gear 26 being keyed to the drive shaft 12 for rotation therewith. The housing 22 is also provided with a pair of recesses 28 in side-by-side relation to the recess 24 for receiving gears 30 therein which are in meshing engagement with the central gear 26 at diametrically opposed points. The gears 30 are mounted on shafts 32 for rotation in the same direction since they are in meshing engagement with a common gear at opposite points thereof.

As illustrated in Figure 2, the casing or housing 22 is provided with a removable side 34 having cap screw bolts 36 securing the same to the casing 22 and a suitable seal or gasket 38 is provided between the removable cap 34 and the casing 22. Also, the drive shaft 12 is journaled in suitable ball bearings 40 disposed in counterbores 42 in the casing 22. Also, the casing 22 as well as the cap 34 is provided with a longitudinally extending cylindrical boss 44 which is disposed in concentric spaced relation to the shaft 12 for receiving packing material 46. The packing material 46 is retained in compressed relation by a stuffing box member 48 telescopic into the cylindrical boss 24 and movable longitudinally in relation thereto by bolts 50 whereby the gasket material or packing 46 may be compressed for completely sealing the shaft 12 in relation to the interior of the casing 22.

The end walls of the casing 22 may be provided with threaded sockets 52 for receiving fastening bolts (not shown) for securing the casing 22 in non-rotated position on the frame of the vehicle 14.

The casing 22 is also provided with vertical passages or passagesways 54 and 56 which are in communication with the area between the meshing gears 26 and 30 wherein the passageways 54 and 56 provide outlets for the gear pump formed by each meshing set of gears whereby the present device incorporates a double gear pump. As will be seen by the directional arrows in Figure 1, the passageway 56 terminates at its lower end in a horizontally disposed portion while the passageway 54 terminates at its upper end in a horizontally disposed portion and in each horizontally disposed portion there is provided an enlarged cylinder 58 forming a junction between the passageways 54 and 56 with the end of the horizontal portion of the passageways forming valve seats 60 for engagement by piston 62 having valve heads 64 on one end thereof for selective engagement with the valve seats 60 and for longitudinal sliding movement in the cylinders 58. The pistons 62 are provided with longitudinal bores 66 for a purpose to be described hereinafter. The ends of the cylinders 58 are provided with removable caps 68 that are in communication with conduits or inlet lines 70 of the storage tank which lines are interconnected by a T-coupling 72 and extend from thence by a single conduit or inlet line 74 into the interior of a control housing 76 at the top thereof. Extending downwardly from the control housing 76 at the bottom thereof is a conduit 78 having two branches with each branch 80 communicating with a passageway on the inlet side of the gear pumps.

The tank 76 is in the form of a storage tank and has a cooling coil 82 disposed therein for cooling the hydraulic fluid and maintaining the same at a predetermined temperature. A movable valve member 84 is disposed in the tank 76 with its remote ends slidably received in tubular valve seats 86 and 88 respectively. The position of the valve member 84 is determined by a lug 87 mounted thereon which is connected to a bell crank lever 89 having one end thereof connected to a Bowden cable 90 and the center thereof connected to a bracket 92 wherein the Bowden cable 90 extends to a control member 94 on the dashboard 20. The other end of the bell crank lever 89 is connected to the lug 87 through a compression coil spring 95 which provides a safety release for assuring that too much pressure will not be exerted on the pistons 62 by pressure exerted by the valve member 84. A flange 96 is provided on the valve 84 and a compression coil spring 98 is disposed between the flange 96 and an abutment 99 on the valve seat 86 for normally urging the valve 84 downwardly. The upper end of the valve 84 is substantially conical as designated by the numeral 100 and is hollow and is provided with transverse openings 102 for a purpose described hereinafter. The lower end of the valve 84 is slidably disposed in the valve seat 88 which is substantially similar in construction to the valve seat 86 which forms an intercommunication between the tank 76 and the intake of the intermeshed gears 26 and 30 contained in the housing 22.

Each of the pistons 62 is provided with a reduced cylindrical portion 63 which has the valve head 64 thereon. The reduced portion 63 is slidably received within a dividing plate 65 and the valve head 64 is in alignment with the horizontal portion of the respective passageways and the valve head 64 forming a valve when the piston 62 is moved away from the closure cap 68 of the cylinder 58. The dividing plate 65 also divides the cylinder 58 into two separate areas. The upper edge of the dividing plate 65 is provided with an angulated portion 67 which communicates the area of the cylinder 58 inwardly of the dividing plate 65 with the inlet port 69 which is the terminal end of the branches of the conduit 78 extending downwardly from the supply tank 76. The inlet port 69 is in communication with that portion of the piston 62 which forms the differential in area between the large face of the piston 62 and the valve face 64. Therefore, the fluid pressure caused by the restriction at 67 acts against the valve head 64 and forces a certain amount of the fluid through the passageway 66 and by closing off the conduit 74 by valve 84, pressure will build up against the outer face of the piston 62 and against the cap 68 of the cylinder 58 thus urging the piston 62 to the right as viewed in Figure 1 thereby engaging the valve head 64 with the valve seat 60 thus throttling the discharge from the pumps and slowing down the drive shaft.

When the pump is not desired to be operative or when the brakes are not being applied, the valve 84 is moved downwardly for seating engagement in the valve seat 88. This reveals or exposes aperture 102 to the interior of the tank 76 wherein air may be taken into the hollow valve 84 and thus be drawn into the pumps within the casing 22. The fluid being discharged by the pumps is discharged through the apertures 104 in valve seat 86 thereby maintaining the pump casing 22 free of hydraulic fluid and preventing any drag on the drive shaft which would be caused by the circulation of fluid in the pump. This is the normal operating condition of the brake in that until such time as the valve 84 is moved upwardly thus opening the ports in the valve seat 88 and permitting the flow of hydraulic fluid to go into the inlet side of the pumps. Inasmuch as the pumps are of the positive displacement type there will be no problem of air binding and the liquid will flow into the inlet of the pumps by gravity and as the valve member 84 is continued to be moved upwardly, the openings 104 will be closed off and pressure will build up in the conduits 70 and 72 thus moving the piston 62 towards a closed position.

If the pressure exerted on the valve member 84 reaches a predetermined maximum, the valve member 84 will be moved downwardly against the tension of spring 95 by the force of the pressure exerted against the conical upper end 100 of the valve member 84 thereby assuring that too much braking force will not be applied since relief of this pressure will permit movement of the piston 62 away from the valve seats 60 thereby permitting circulation of liquid.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A hydraulic brake system for retarding the rotation of a shaft, said brake system comprising a gear pump having a plurality of meshing gears at least one of which is connected to a shaft, a storage tank for maintaining a reserve of hydraulic fluid having inlet and outlet lines connected thereto and with the former line connected to the outlet side of the pump and the latter line connected to the inlet side of the pump, said pump having a passage means in the casing thereof for recirculation of the hydraulic fluid, said inlet line communicating with said passage means, a pressure operated restricting valve in said pump passage restricting the flow of fluid therethrough in response to increased pressure in said inlet line, and manually operated valve means in said inlet line controlling the flow of fluid therethrough, said manually operated valve being spring-loaded whereby pressure in said inlet line exceeding a predetermined amount will open said manually operated valve and thereby decrease pressure in said inlet line.

2. The combination of claim 1 wherein said manually operated valve includes a means for the admittance of air on the intake side of said pump thereby voiding said pump of hydraulic fluid and minimizing the drag on said shaft.

3. The combination of claim 1 including a cylinder disposed in said casing having one end communicating with said passageway and the other end communicating with said inlet line, a valve seat in said passageway adjacent said cylinder, an apertured dividing plate disposed on said cylinder adajcent said seat with both sides of said dividing plate in communication with the inlet side of said pump, a piston slidably disposed in said cylinder having a diametrically reduced end portion adjacent said seat slidably through said plate and engageable with said seat, and a longitudinal bore extending through said piston whereby fluid pressure in said casing will effect a greater force on the larger end of said piston than upon the diametrically reduced end thereof upon the closing of said inlet line by said manually operated valve and urge said pressure operated valve toward said seat thereby throttling the discharge of said pump.

4. The combination of claim 1 wherein the ends of said inlet and outlet lines remote from said pump communicate with said storage tank through the upper and lower surfaces thereof respectively and are in alignment, said manually operated valve comprising a cylindrical tube sealed at the upper end having its opposite ends slidably disposed in said line ends, each of said ends being provided with a valve seat for closing the corresponding line ends, and means vertically positioning said tube to open one line end upon the closing of the other.

5. The combination of claim 4 including an aperture formed in said tube adjacent the upper end thereof, said aperture being disposed above the liquid level of said storage tank whereby air will be introduced into said outlet line upon the movement of said tube into sealing engagement with said outlet line.

6. A hydraulic brake system for retarding the rotation of a shaft, said brake system comprising a gear pump having a plurality of meshing gears at least one of which is connected to a shaft, a storage tank for maintaining a reserve of hydraulic fluid having inlet and outlet lines connected thereto and with the former line connected to the outlet side of the pump and the latter line connected to the inlet side of the pump, said pump having a passage means in the casing thereof for recirculation of the hydraulic fluid, said inlet line communicating with said passage means, a pressure operated restricting valve in said pump passage restricting the flow of fluid therethrough in response to increased pressure in said inlet line, and manually operated valve means in said inlet line controlling the flow of fluid therethrough, said manually operated valve being spring-loaded whereby pressure in said inlet line exceeding a predetermined amount will open said manually operated valve and thereby decrease said pressure in said inlet line, said manually operated valve including a means for the admittance of air on the intake side of said pump thereby voiding said pump of hydraulic fluid and minimizing the drag on said shaft.

7. The combination of claim 6 including a cooling coil disposed in said storage tank for cooling said hydraulic fluid.

8. A hydraulic brake system for retarding the rotation of a shaft, said brake system comprising a casing having a central gear with a pair of gears disposed on opposite sides thereof, one of said gears being connected to said shaft for the control thereof, said gears forming two pumps, a storage tank for maintaining a reserve of hydraulic fluid having an inlet and an outlet line connected thereto from the outlet and inlet openings of said pump casing respectively, said casing having passages therein for the recirculation of the hydraulic fluid from said outlet to said inlet openings, said inlet line communicating with said passage means, pressure operated restricting valves in said passages restricting the flow of fluid therethrough in response to increased pressure in said inlet line, and a manually operated valve in said inlet line controlling the flow of fluid therethrough, said manually operated valve being spring-loaded whereby pressure in said inlet line exceeding a predetermined amount will open said manually operated valve and thereby decrease said pressure in said inlet line.

9. A hydraulic brake system for retarding the rotation of a shaft, said brake system comprising a casing having a central gear with a pair of gears disposed on opposite sides thereof, one of said gears being connected to said shaft for the control thereof, said gears forming two pumps, a storage tank for maintaining a reserve of hydraulic fluid having an inlet and an outlet line connected thereto from the outlet and inlet openings of said pump casing respectively, said casing having passages therein for the recirculation of the hydraulic fluid from said outlet to said inlet openings, said inlet line communicating with said passage means, pressure operated restricting valves in said passages restricting the flow of fluid therethrough in response to increased pressure in said inlet line, and a manually operated valve in said inlet line controlling the flow of fluid therethrough, said manually operated valve being spring-loaded whereby pressure in said inlet line exceeding a predetermined amount will open said manually operated valve and thereby decrease said pressure in said inlet line, said manually operated valve including a means for the admittance of air on the intake side of said pump thereby voiding said pump of hydraulic fluid and minimizing the drag on said shaft.

10. A hydraulic brake system for retarding the rotation of a shaft, said brake system comprising a casing having a central gear with a pair of gears disposed on opposite sides thereof, one of said gears being connected to said shaft for the control thereof, said gears forming two pumps, a storage tank for maintaining a reserve of hydraulic fluid having an inlet and an outlet line connected thereto from the outlet and inlet openings of said pump casing respectively, said casing having passages therein for the recirculation of the hydraulic fluid from said outlet to said inlet openings, said inlet line communicating with said passage means, pressure operated restricting valves in said passages restricting the flow of fluid therethrough in response to increased pressure in said inlet line, and a manually operated valve in said inlet line controlling the flow of fluid therethrough, said manually operated valve including a means for the admittance of air on the intake side of said pump thereby voiding said pump of hydraulic fluid and minimizing the drag on said shaft.

References Cited in the file of this patent

UNITED STATES PATENTS

| | | |
|---|---|---|
| 721,303 | Hoff | Feb. 24, 1903 |
| 1,679,085 | Hull | July 31, 1928 |
| 1,787,796 | Price | Jan. 6, 1931 |
| 1,821,178 | Fisher | Sept. 1, 1931 |
| 1,891,793 | Kauffman | Dec. 20, 1932 |
| 2,179,540 | Burdick | Nov. 14, 1939 |
| 2,334,629 | James | Nov. 16, 1943 |
| 2,550,405 | Crosby | Apr. 24, 1951 |
| 2,723,010 | Stelmack | Nov. 8, 1955 |
| 2,827,854 | Huber | Mar. 25, 1958 |

FOREIGN PATENTS

| | | |
|---|---|---|
| 812,657 | France | Feb. 8, 1937 |